United States Patent [19]

Vachon

[11] 3,863,548
[45] Feb. 4, 1975

[54] HYDRAULIC WHEEL
[76] Inventor: Bertrand Vachon, R.R. 3, Thetford Mines, Quebec, Canada
[22] Filed: Mar. 15, 1973
[21] Appl. No.: 341,544

[52] U.S. Cl. ............................................. 91/495
[51] Int. Cl. ........................................... F04b 1/06
[58] Field of Search ............ 91/494, 495, 498, 485, 91/176; 180/66 F; 417/521, 529, 539, 460, 464, 465

[56] References Cited
UNITED STATES PATENTS

| | | | |
|---|---|---|---|
| 1,484,960 | 2/1924 | Peck | 91/496 |
| 1,983,261 | 12/1934 | Zorzi | 91/495 |
| 2,689,531 | 9/1954 | Benedek | 91/498 |
| 2,766,702 | 10/1956 | McVittie | 91/495 |
| 2,932,256 | 4/1960 | Orshansky | 91/485 |
| 3,058,429 | 10/1962 | Rocheville | 91/495 |
| 3,273,464 | 9/1966 | Thurber | 180/66 F |
| 3,675,730 | 7/1972 | Kontranowski | 180/66 F |
| 3,726,188 | 4/1973 | Siebelt | 91/498 |

Primary Examiner—William L. Freeh
Assistant Examiner—Gregory Paul LaPointe
Attorney, Agent, or Firm—Bacon & Thomas

[57] ABSTRACT

A hydraulic wheel comprises a fixed axle with a wheel journalled thereon, and a shaft eccentric to the axle which carries side by side three sleeves connected to cylinders which have their pistons pivoted to the wheel. A high-pressure conduit and a low-pressure conduit communicate with the cylinder through ports in the shaft and orifices in the sleeves and are operative to extend each cylinder and piston as the same moves within a sector disposed rearwardly with respect to the direction of rotation wheel, the extension of the pistons being operative to rotate the wheel. The arrangement represents a simplification of hydraulic wheels as compared with the prior art and the possibility of applying pressure through a greater angular range so as to improve the efficiency of the device.

1 Claim, 4 Drawing Figures

HYDRAULIC WHEEL

The present invention relates to hydraulic wheels of the type in which the wheel is rotated by applying fluid pressure through cylinders and pistons which react against a member eccentric to the wheel.

Hydraulic wheels of this type are well known and widely used especially for heavy equipment applications involving high torque requirements and low speed. In the conventional hydraulic wheels, the cylinders and the pistons are normally located within a common plane and complex arrangements are necessary for supplying fluid pressure to the various cylinders at the appropriate time.

It is an object of the present invention to substantially simplify the construction of such a hydraulic wheel by reducing the number of pistons as well as the number of moving parts required for the distribution of the fluid to the cylinders. At the same time, the invention seeks to ensure the most efficient use of the fluid by increasing the angular range of fluid supply to each piston.

The invention accordingly provides a hydraulic wheel comprising a fixed axle, a wheel journalled on the axle, a shaft eccentric to the axle, at least three cylinders each having a sleeve journalled on the shaft, a piston in each cylinder the outer ends of the pistons being pivoted to the wheel at evenly angularly spaced points thereof, a high pressure conduit and a low pressure conduit in the shaft, ports connected to the conduits and opening on opposite sides of the shaft, and orifices in the sleeves connecting the ports to the interior of the cylinders. Due to this arrangement, the only moving parts required are the connections of the pistons and the cylinders to the wheel and shaft and no other moving parts such as rotary valves or other distributing devices are needed. Furthermore, the arrangement enables only three pistons to be used and due to their separate connection to the shaft, each of these pistons is enabled to operate during substantially one-third of the movement of rotation of the wheel.

Further according to the invention, three cylinders are provided and there are three spaced ports communicating with each of the high pressure and low pressure conduits, each of the spaced pairs of ports being registrable with one of the sleeve orifices. This arrangement ensures appropriate leak-free supply of the pressure fluid.

Still according to the invention, the sleeves are adjacently mounted on the shaft between a portion of the axle and an external flange, and sealing means are provided between adjacent faces of the sleeves, axle and flange to further ensure leak-free operation.

Further according to the invention, the shaft is slidable in the axle and keyed thereto and has at its inner end a nut for adjustably tightening the external flange against the sleeves. This arrangement provides for easy assembly and disassembly of the parts for manufacture and servicing of the wheel.

Further according to the invention, a sealing member is provided between the shaft and the axle to avoid leaks along the shaft.

Still according to the invention, a circumferential closed portion is provided between each pair of ports associated with any one sleeve of slightly greater extend than the sleeve orifices to avoid leakage of fluid from the high pressure to the low pressure conduit.

Further according to the invention, each port has a circumferential extent of more than 120°. This arrangement ensures the application of continuous propulsive force during the wheel rotation.

A preferred embodiment of the invention is illustrated by way of example in the accompanying drawings in which FIG. 1 is a longitudinal section of a hydraulic wheel constructed according to the invention taken on line 1—1 of FIG. 2

Figure 1:
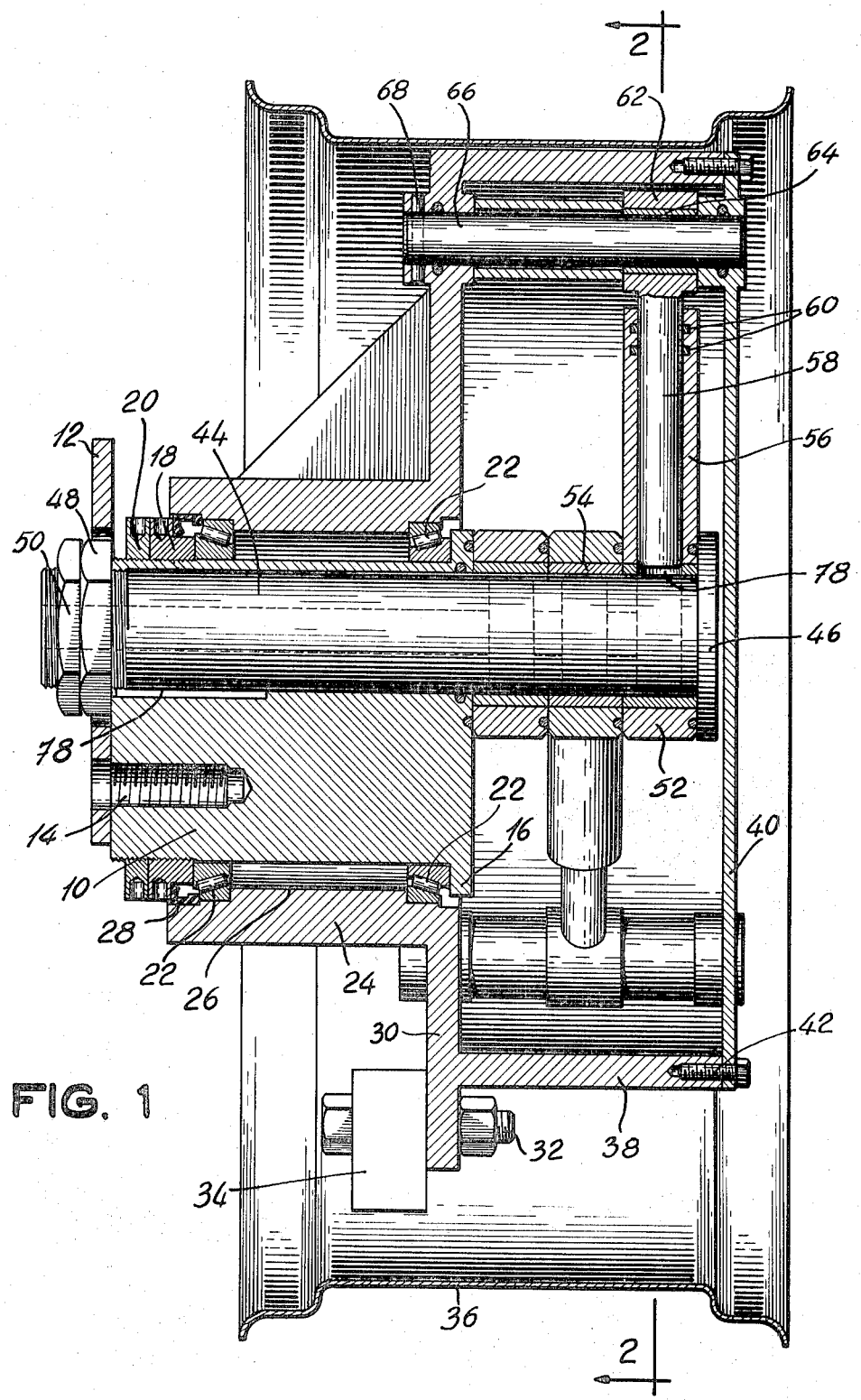

Referring to the drawings, the hydraulic wheel illustrated therein, comprises an axle 10 secured to a vehicle chassis part 12 by a number of set screws 14. The axle 10 has a flange 16 at its outer end and is threaded at the inner end to receive a nut 18 and a locknut 20. A pair of tapered roller bearing 22 is fastened between nut 18 and the flange 16 and carries a hub 24 having an internal stepped portion 26 fastened between the outer races of bearings 22. A seal 28 is provided between the hub 24 and the locknut 18.

The hub 24 is integral with a generally triangular spoke section 30 secured by bolts 32 to brakets 34 connected to the interior of a wheel rim 36. The spoke section 30 is integral with axially disposed continuous walls 38 forming a casing closed by a plate 40 connected to walls 38 by screws 42.

The axle 10 is traversed by an axial eccentric bore in which is mounted a shaft 44 having a flange 46 at its outer end and a threaded portion at its inner end on which are screwed a nut 48 engaging the inner face of axle 10 and a locknut 50.

Shaft 44 has journalled thereon between flange 46 and the outer face of axle 10 three sleeves 52 with bronze bearings 54 interposed between the sleeves and the shaft ans secured to the sleeves 52. Each sleeve 52 is integral with a cylinder 56 which has slidably mounted therein a piston rod 58 sealed by seal rings 60. Each piston rod 58 has at the other end thereon and integral bushing 62 journalled by a bearing 64 on a pin 66 fastened between the spoke section 30 and the cover plate 40 and secured by a transverse pin 68. Pins 66 are concentric with the axle 10 and have their axes evenly distributed with respect to the axis of axle 10 namely, at angles of 120° from each other.

O-ring seals are provided between shaft 44 and axle 10 adjacent to flange 16, between adjacent faces of sleeves 52, between the outer faces of sleeves 52, adjacent flange 46 and flange 16 and between each pin 66 and the respective pin receiving bores in spoke section 30 and plate 40.

Shaft 44 has two longitudinal bores 70, 72 constituting respectively, a high pressure and a low pressure conduit. Three pairs of ports 74, 76 are provided respectively on opposite sides of shaft 44 in communication with conduits 70 and 72, respectively. Each port 74, 76 has a circumferential extent of more than 120° and each pair of ports 74, 76 is registrable with an orifice 78 through bearing 54. The chamber of each cylinder 56 extends through the corresponding sleeve 52 and is in communication with the orifice 78.

OPERATION

Figure 2:
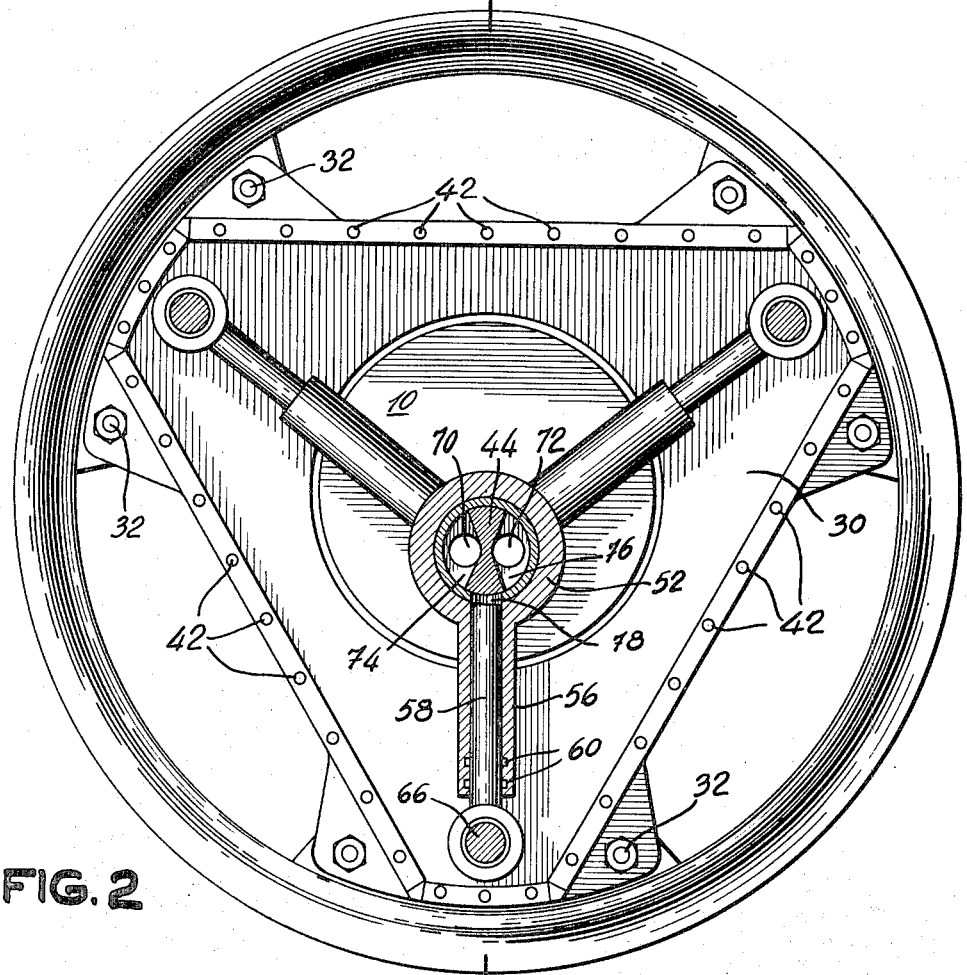
FIG. 2 is a cross-section taken on line 2—2 of FIG. 1
Figure 3:
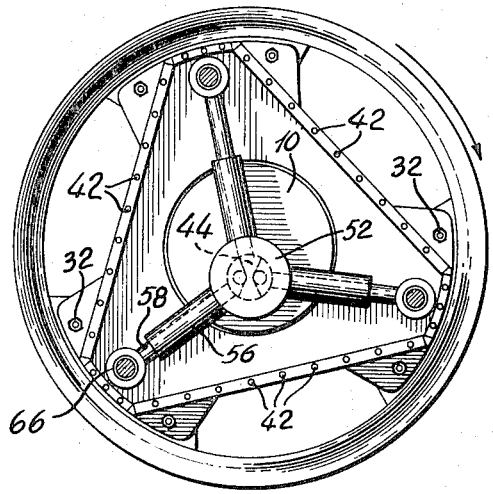
FIGS. 3 and 4 are cross-sections similar to FIG. 2 on a reduced scale showing two other positions taken by the wheel during the rotation thereof.
Figure 4:
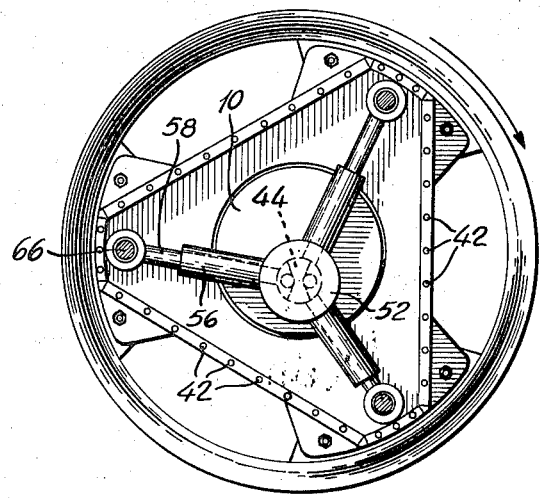

With reference to FIG. 3, incompressible hydraulic fluid under pressure is supplied to a conduit 70 from a pump not shown, through suitable ducting not shown, connected to a conduit 70. The fluid passes through orifice 78 into the cylinder 56 disposed at the lower left of FIG. 3 and extends the corresponding piston 58 causing rotation of the wheel in the direction of the arrow in FIG. 3. Extension of the piston and rotation of the wheel continues through the action of the pressure fluid until the piston moves past the position shown in FIGS. 4 and 2, and orifice 78 is no longer in register with port 74 as shown by the upper piston in the FIG. 3.

By this time, the next subsequent piston is in register with port 74 so that rotation of the wheel continues in the manner above described. When the top piston of FIG. 3 reaches the position of the top piston of FIG. 4, the corresponding cylinder enters into communication with port 76, and the fluid in the cylinder is evacuated through the low pressure conduit 72 allowing the piston to retract until the piston reaches the position indicated at the lower right in FIG. 4 at which time the piston is fully retracted.

It will be noted that the circumferential closed portion, provided between the ports of each pair of ports 74, 76 by the retained central portion of shaft 44 indicated in FIG. 2, is of slightly greater circumferential extent than the orifice 78 so that no direct communication is provided between the high and low pressure conduits 70, 72. These circumferential portions correspond to the top and bottom positions of the cylinders in which relatively little movement of the pistons takes place.

If desired, a valve not shown may be interposed in the ducting leading to conduits 70 and 72 to switch the conduits so that the conduit 72 becomes the high pressure conduit, while the conduit 70 becomes the low pressure conduit. In this position, the rotation of the wheel is reversed with respect to the direction indicated by the arrows in FIGS. 3 and 4.

Such a valve may also incorporate a locking device closing off both conduits to provide a braking position.

The proper positioning of shaft 44 is ensured by the fact that the shaft is keyed at 78 to the axle 10, such keying also serving to hold the shaft 44 when the pressure of flange 46 against sleeves 52 is adjusted by means of a nut 48 to provide sealing tightness while preventing excessive friction.

I claim:

1. A hydraulic wheel comprising:

a fixed axle;

a wheel journalled on said axle;

a shaft eccentric to said axle extending slidably therethrough and keyed thereto against rotation;

at least three cylinders each having a sleeve journalled on said shaft, all said sleeves being adjacent;

a piston in each cylinder, the outer ends of said piston being pivoted to said wheel at evenly angularly spaced points thereof;

a high pressure conduit and a low pressure conduit in said shaft;

ports communicating with said conduits and opening in respectively opposite sides of said shaft;

orifices in said sleeves connecting said ports to the interior of said cylinders;

a flange on an end of said shaft confining said sleeves between said flange and axle;

a nut threaded on said shaft for drawing said shaft and flange toward said axle;

sealing means between said flange and an adjacent sleeve, between said shaft and an adjacent sleeve and between adjacent sleeves;

said wheel comprising a hub journalled on said axle, a spoke section integral with said hub, an axial wall integral with said spoke section and a removable cover plate externally connected to said wall, said spoke section, wall and cover plate forming an enclosure containing said cylinders and pistons, the outer ends of said pistons being journalled on axial pins extending from said spoke section to said plate and removably supported at its opposite ends on said spoke section and plate, respectively.

* * * * *